US009983901B2

(12) United States Patent
Hurwitz et al.

(10) Patent No.: US 9,983,901 B2
(45) Date of Patent: May 29, 2018

(54) DYNAMIC SHARD ALLOCATION ADJUSTMENT (71) Applicant: Google LLC, Mountain View, CA (US)

(72) Inventors: Jeremy S. Hurwitz, Mountain View, CA (US); Eugene R. Kirpichov, Mountain View, CA (US); Jelena Pjesivac-Grbovic, Mountain View, CA (US); Kenneth J. Goldman, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 322 days.

(21) Appl. No.: 14/327,338

(22) Filed: Jul. 9, 2014

(65) Prior Publication Data
US 2016/0011901 A1    Jan. 14, 2016

(51) Int. Cl.
*G06F 9/46*     (2006.01)
*G06F 9/48*     (2006.01)
(52) U.S. Cl.
CPC .............. *G06F 9/46* (2013.01); *G06F 9/4843* (2013.01)
(58) Field of Classification Search
CPC ......... G06F 9/4881; G06F 9/5066; G06F 9/50
USPC ............................................................ 718/1
See application file for complete search history.

(56) References Cited

U.S. PATENT DOCUMENTS 8,555,281 B1 * 10/2013 van Dijk ............... G06F 9/4881
                                                       718/100
9,207,964 B1 * 12/2015 Gwosdek .......... G06F 17/30743
9,329,937 B1 *  5/2016 Grant ...................... G06F 11/14
9,417,917 B1 *  8/2016 Barber .................. G06F 9/5005
2008/0115143 A1 *  5/2008 Shimizu ................ G06F 9/5066
                                                        718/105
2010/0162245 A1    6/2010 Plancarte et al.
2011/0067030 A1 *  3/2011 Isard ....................... G06F 8/433
                                                        718/102

(Continued)

FOREIGN PATENT DOCUMENTS

CA       2631255       11/2009
EP       2746941        6/2014

OTHER PUBLICATIONS

International Report on Patentability and Written Opinion for International Application No. PCT/US2015/039239 dated Jan. 10, 2017, 8 pages.

(Continued)

*Primary Examiner* — Wei Zhen
*Assistant Examiner* — Brahim Bourzik
(74) *Attorney, Agent, or Firm* — Fish & Richardson P.C.

(57) ABSTRACT

The present disclosure relates to dynamically adjusting shard allocation during parallel processing operations. One example method includes determining a target completion time for a batch data processing job of an input data set performed by a plurality of tasks, each of the plurality of tasks processing a different input shard including a different portion of the input data set; identifying a first task having an estimated completion time greater than the target completion time of the batch data processing job; and splitting the first input shard into a first split input shard and a second split input shard different from the first split input shard, the first split input shard including a first portion of the first input shard, and the second split input shard including a second portion of the first input shard different from the first portion.

18 Claims, 5 Drawing Sheets

(56) References Cited

U.S. PATENT DOCUMENTS

2011/0145034 A1 6/2011 Moore
2011/0161959 A1 6/2011 Sharon et al.
2013/0036149 A1* 2/2013 Kosuru ................ G06F 9/5027
709/201

OTHER PUBLICATIONS

Hoekstra et al., "Optimal job splitting in parallel processor sharing queues," Preprint submitted to Stochastic Models, Apr. 20, 2011, 22 pages.
Logan, "Blistering ETL Performance using the Intelligent, Dynamic and Parallel Capabilities of SAS®," SAS Global Forum 2010, Paper 119-2010, May 2011, pp. 1-8.
Unknown Author, "Pattern 2 (Parallel Split)," Workflow Patterns, retrieved on May 7, 2014. Retrieved from the Internet: URL<http://www.workflowpatterns.com/patterns/control/basic/wcp2.php>, 4 pages.
Xia et al., "Dynamic on-line task scheduling on parallel processors," Performance Evaluation, 46(2-3):219-233, Oct. 2001.
International Search Report and Written Opinion for International Application No. PCT/US2015/039239, dated Nov. 10, 2015, 11 pages.

* cited by examiner

DYNAMIC SHARD ALLOCATION ADJUSTMENT

BACKGROUND

Large-scale data processing may include parallel processing, which generally involves performing some operation over each element of a large data set simultaneously. The data set may be split into smaller sets, known as "shards," and processed in parallel by separate processes and/or devices.

SUMMARY

The present disclosure relates to dynamically adjusting shard allocation during parallel processing operations.

In general, one innovative aspect of the subject matter described in this specification can be embodied in methods that include the actions of determining a target completion time for a batch data processing job of an input data set, the batch data processing job performed by a plurality of tasks, each of the plurality of tasks processing a different input shard that includes a different portion of the input data set; identifying, from the plurality of tasks, a first task having an estimated completion time greater than the target completion time of the batch data processing job, the estimated completion time representing an estimated time at which the first task will complete processing the portion of the input data set at a first input shard being processed by the first task; and splitting the first input shard into a first split input shard and a second split input shard different from the first split input shard, the first split input shard including a first portion of the first input shard, and the second split input shard including a second portion of the first input shard different from the first portion.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By adapting shard allocation dynamically during a processing job, shard allocation may be better optimized due to more information being available about each particular shard, such as its size, complexity, average processing rate, or other information. Adapting shard allocation in this way also allows the allocation to change in response to observed conditions, such as a task (e.g., a computing resource) processing a shard more slowly than expected or additional processing resources becoming available.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Large-scale parallel data processing applications must distribute a large input data set for processing by a pool of tasks (e.g., computing resources). This may be performed by partitioning the input data set into smaller sets or "shards," and assigning the shards to available tasks. In cases involving heterogeneous input data sets, task execution environments, network conditions or other varying factors, it may be difficult to partition the input data set evenly such that each task processes its assigned shard in a similar amount of time. Widely divergent shard processing times may lead to "straggler" shards that take much longer to process than other shards. Straggler shards may dominate the total runtime of a particular job if the job requires all shards to be processed before completing. Further, straggler shards may be problematic if the task's computational results are not committed to persistent storage, such as a remote disk. Due to the aforementioned heterogeneity, a particular section of the input data set may be very slow to process or may contain more records than expected. If the task processing the shard fails before the output is persisted, all progress may be lost. If the system waits until an entire shard is processed before committing work, a large amount of work may need to be redone. Large shard sizes may exacerbate such a problem.

Small shard sizes also introduce problems, such as the additional overhead related to assigning and managing a higher number of shards, and the need for tasks to seek to the beginning of each shard when processing rather than sequentially reading larger shards.

Accordingly, the present disclosure describes techniques for adjusting shard allocation dynamically during a parallel processing operation. One example includes a central repository of unclaimed shards, a pool of tasks, and a supervisor. Initially, the supervisor divides an input data set into enough shards for each task to be busy. Each task then monitors its own progress while processing its shard. Based on what each task observes, it publishes an estimate for when it will complete processing of its shard. The supervisor observes these estimates. If there are no unclaimed shards remaining and at least one task is not busy, the parallel processing operation has entered an "endgame" state. In some cases, when this occurs, the supervisor estimates when the job should finish based on the published estimates from the tasks, assuming perfect sharding/load balancing. This estimate corresponds to each task finishing at the same time, and may be an average of each task's estimated remaining time, counting an idle task's remaining time as zero. The supervisor publishes this estimate for when the operation should complete (the "deadline" or "target completion time") to the tasks. In some cases, the supervisor may provide periodic estimates throughout execution rather than or in addition to when the operation enters the endgame state.

Each task, upon receiving the target completion time, estimates how much of its shard can be processed by the target completion time. If the task can complete processing before the target completion time, then it continues processing as normal. If not, the task estimates how much of the shard it can process before the target completion time. For example, the task may assume that its average rate of progress will remain constant. Based on this estimate, the task splits its shard into a prefix and a suffix. The prefix contains the portion of the shard that the task expects to complete by the target completion date. The suffix contains the portion that the task does not expect to complete. The task returns the suffix to the supervisor. Idle tasks then claim shards from the returned suffixes for processing. Note that an operation can enter and exit this "endgame" state multiple times during execution, and the cycle of publishing an estimated completion time and tasks splitting can occur multiple times during execution.

Another example method includes determining a target completion time for a batch data processing job of an input data set performed by a plurality of tasks. Each of the plurality of tasks processes an input shard representing a different portion of the input data set. From the plurality of tasks, a first task processing a first input shard is identified having an estimated completion time greater than a target completion time of the batch data processing job. In response, the first input shard is split into multiple different input shards each including a portion of the first input shard. The different input shards may then be assigned to different tasks for completion.

These features and additional features are described in more detail below.

Figure 1:
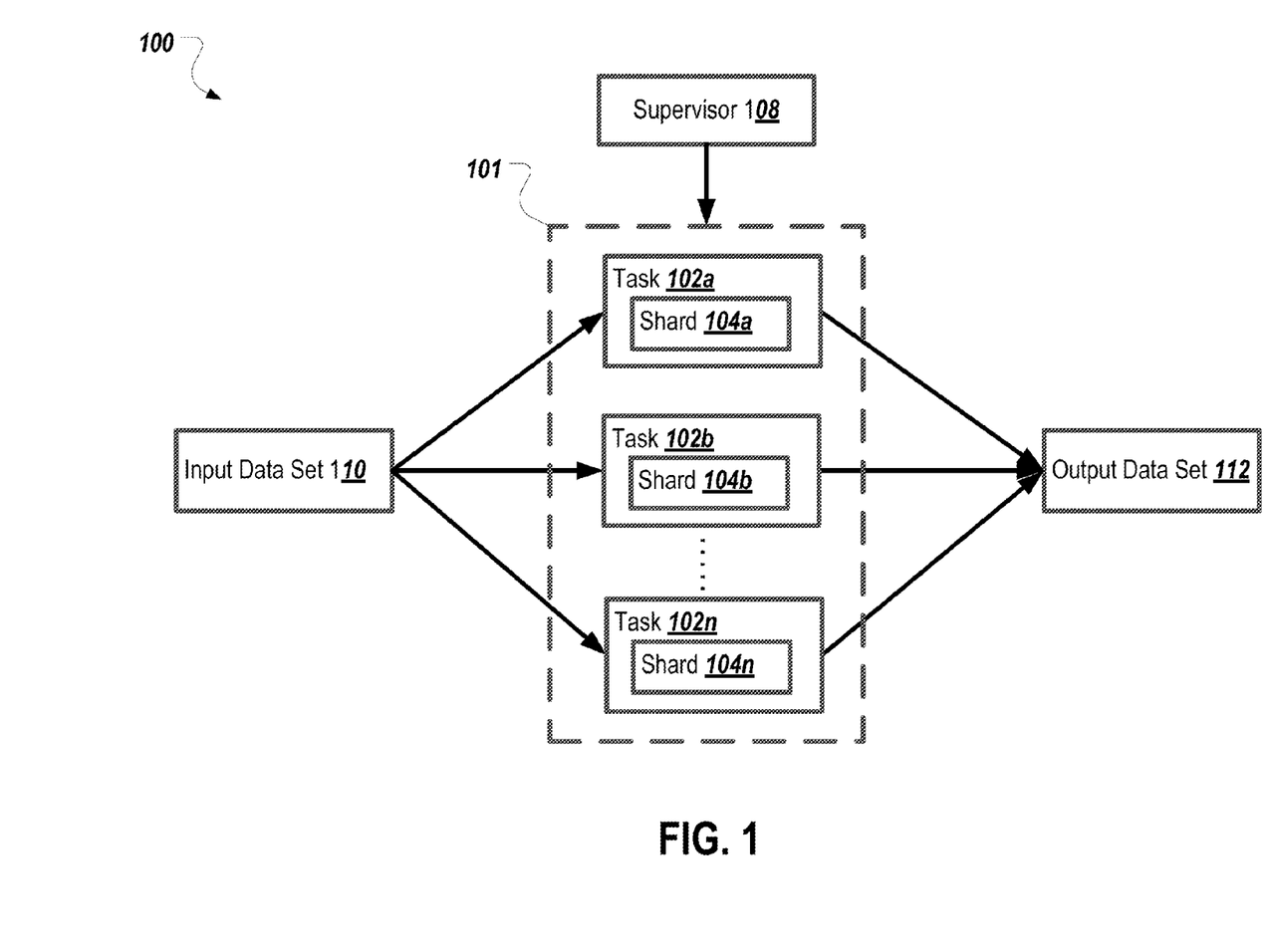
FIG. 1 is a block diagram of an environment in which dynamically adjusting shard allocation during parallel processing operations can occur.

FIG. 1 is a block diagram of an environment 100 in which dynamically adjusting shard allocation during parallel processing operations can occur. As shown, the environment 100 includes a parallel processing operation 101 including a plurality of tasks 102a-n processing the plurality of shards 104a-n. The parallel processing operation 101 is supervised by a supervisor 108. In operation, an input data set 110 is split into the shards 104a-n for processing by the tasks 102a-n. The tasks 102a-n process the shards 104a-n to produce the output data set 112.

Environment 100 includes a parallel processing operation 101. In some implementations, the parallel processing operation 101 may be any type of distributed processing application, such as, for example, a map reduce, a pipeline, a distributed query, or another type of application. The parallel processing operation 101 may be configured to execute across one or more servers connected by communicating over a network. In some cases, the parallel processing operation 101 may include additional components besides those pictured to split the input data set 110 into the shards 104a-n for processing by the tasks 102a-n. In some cases, the supervisor 108 may perform this operation. The tasks 102a-n may also perform the splitting operation.

The parallel processing operation 101 includes tasks 102a-n. In operation, the tasks 102a-n process the associated shards 104a-n. In some cases, the tasks 102a-n may each perform the same processing operations on the respective shards 104a-n. The tasks 102a-n may be software processes executing on one or more servers. In some cases, the tasks 102a thread may include different types of components, such as, for example, mappers, reducers, shufflers, combiners, pipeline objects, or other types of components.

The supervisor 108 supervises the parallel processing operation 101 by communicating with the tasks 102a-n. In some implementations, the supervisor 108 is a software process or set of software processes executing on a server or set of servers. The supervisor 108 may communicate with the tasks 102a-n over a network (not shown). The communication may include the exchange of status information from the tasks 102a-n to supervisor 108. The communication may also include indication from the supervisor 108 regarding statistics for the parallel processing operation 101, such as a target completion time (discussed below). In some cases, the supervisor 108 may control the operation of the tasks 102a-n, such as, for example, pausing the tasks 102a-n, resuming the tasks 102a-n, assigning shards to the tasks 102a-n, splitting the tasks 102a-n, or other operations.

As shown, the parallel processing operation 101 processes the input data set 110. The input data set 110 may include any combination of structured or unstructured data, such as, for example, key value pairs, files, database rows, database columns, or other types of data. Similarly, the output data set 112 produced by the parallel processing operation 101 may include any combination of structured or unstructured data, such as, for example, key value pairs, files, database rows, database columns, or other types of data. In some cases, the type of data included in the output data set 112 may be the same as that included in the input data set 110. The output data set 112 may also be of a different type than the input data set 110. In some implementations, the parallel processing operation 101 may not produce an output data set, such as, for example, for operations that perform an operation (e.g., a database update) for every record in the input data set 110.

Figure 2A:
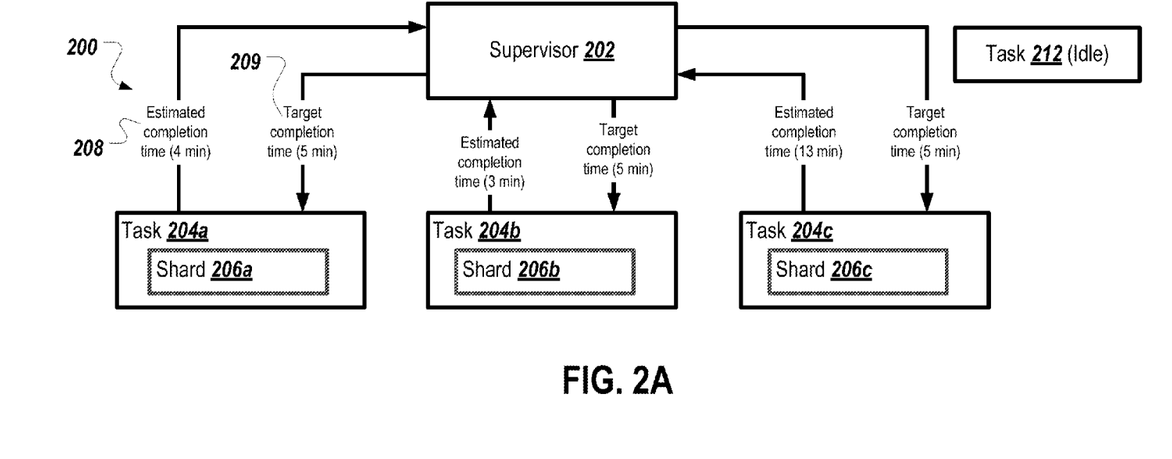
FIG. 2A-B are block diagrams of system configurations before and after a shard split.
Figure 2B:
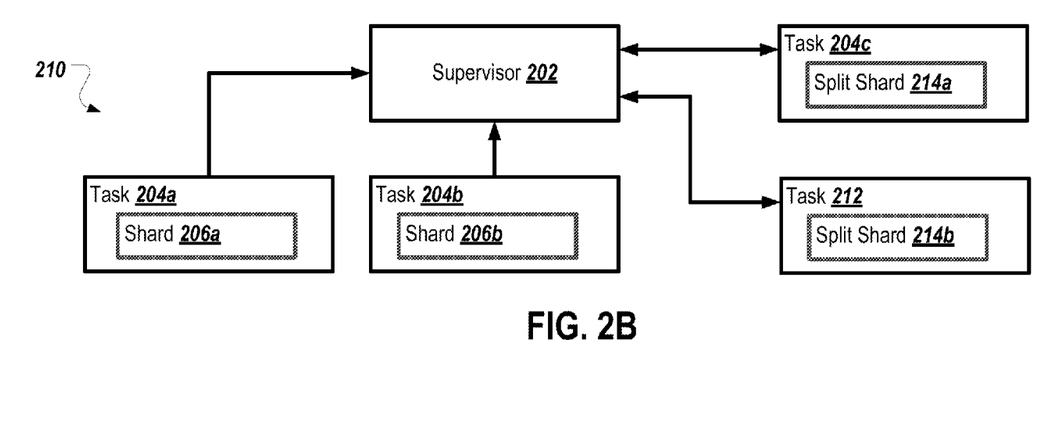

FIG. 2A-B are block diagrams of system configurations before (200) and after (210) a shard split. As shown in FIG. 2A, a supervisor 202 is in communication with one or more tasks 204a-c. The tasks 204a-c process one or more shards 206a-c. At 208, the tasks 204a-c communicate their respective estimated completion times to the supervisor 202. For example, the task 204a communicates an estimated completion time of 4 minutes to the supervisor 202. The task 204b communicates an estimate the completion time of 3 minutes to the supervisor 202. The task 204c communicates an estimated completion time of 13 minutes to the supervisor 202. As shown, task 212 is idle (i.e., not processing a shard) in configuration 200. Because there is an idle task (212) and no shards are yet to be assigned, the job shown in FIG. 2A is in the endgame state.

In response to receiving the estimated completion times from the tasks 204a-c, at 209, the supervisor 202 determines the target completion time for the parallel processing operation associated with the tasks 204a-c. In this case, the supervisor 202 determines the target completion time is 5 minutes. Supervisor 202 may determine a target completion time by averaging the estimated completion time for each task 204a-c as well as idle task 212, which may be treated as having a completion time of 0. In some cases, the supervisor 202 may determine a target completion time based on a target completion time specified for the parallel processing operation including the tasks 204a-c and 212, such as a deadline specified by an administrator of the parallel processing operation. In some implementations, the target completion time represents an expected completion time for the parallel processing operation assuming that the tasks 204a-c complete at the same time. The target completion time may also represent a weighted average of the reported completion times of the tasks 204a-c and 212. The target completion time may also be determined by the supervisor 202 according to other procedures or algorithms.

In some cases, the communications between the tasks 204a-c and 212, and the supervisor 202 at 208 and 209 occur over a network (not shown). The communication may be performed according to one or more networking protocols such as, for example, Hypertext Transfer Protocol (HTTP), Simple Network Management Protocol (SNMP), Remote Procedure Call (RPC), or other protocols.

FIG. 2B shows the system configuration 210 after a split of the shard 206c. In operation, the task 204c may receive the target completion time from the supervisor 202. The task 204c may compare the target completion time of 5 minutes to its estimated completion time of 13 minutes and determine that it will not finish processing the shard 206c before the target completion time. In response, the task 204c may split the shard 206c into the split shards 214a-b, each containing a portion of the shard 206c. The task 204c may continue processing the split shard 214a. The split shard 214b may be processed by (previously idle) task 212. In some cases, the split shard 214b may be sent to the supervisor 202 by the task 204c. The supervisor 202 may then assign the shard 214b to the task 212. The supervisor 202 may also place the split shard 214b into a location where an idle task, such as task 212, may claim the split shard 214b for processing. In some cases, this shard split may be initiated by the supervisor 202, such as through a message sent to the task 204c. Although FIG. 2B shows the shard 206c being split into two new shards, in some cases, the shard 206c may be split into more than two shards.

Figure 3:
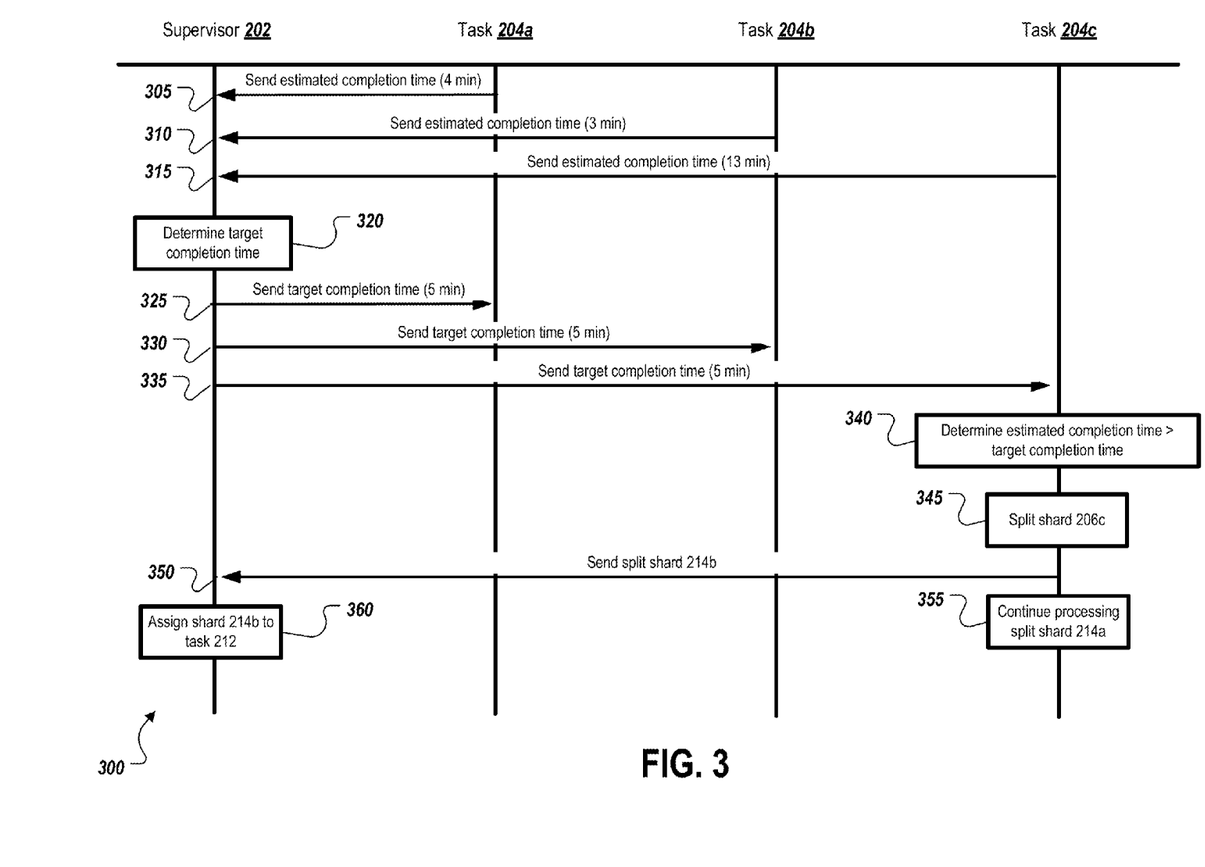
FIG. 3 is a sequence diagram of an example process for dynamically adjusting shard allocation during a parallel processing operation.

FIG. 3 is a sequence diagram of an example process 300 for dynamically adjusting shard allocation during a parallel processing operation. FIG. 3 provides more detail regarding the operation shown in FIGS. 2A-B. At 305, the task 204a sends its estimated completion time (4 minutes) to the supervisor 202. At 310, the task 204b sends its estimated completion time (3 minutes) to the supervisor 202. At 315, the task 204c sends its estimated completion time (13 minutes) to the supervisor 202. In some cases, this communication may take place as described relative to FIGS. 2A-B. At 320, supervisor 202 determines a target completion time based on the estimated completion times from the tasks 204a-c. Again, the target completion time may be computed as described relative to FIGS. 2A-B. At 325-335, the supervisor 202 sends a target completion time (5 minutes) to the tasks 204a-c. This communication may take place as described relative to FIGS. 2A-B.

At 340, the task 204c determines that it's estimated completion time (13 minutes) is greater than the target completion time (5 minutes) it received from the supervisor 202. In response, the task 204c splits its associated shard 206c (345). At 350, the task 204c sends the split shard 214b to the supervisor 202. At 355, the task 204c continues processing the split shard 214a. At 360, the supervisor 202 assigns the shard 214b to task 212.

Figure 4:
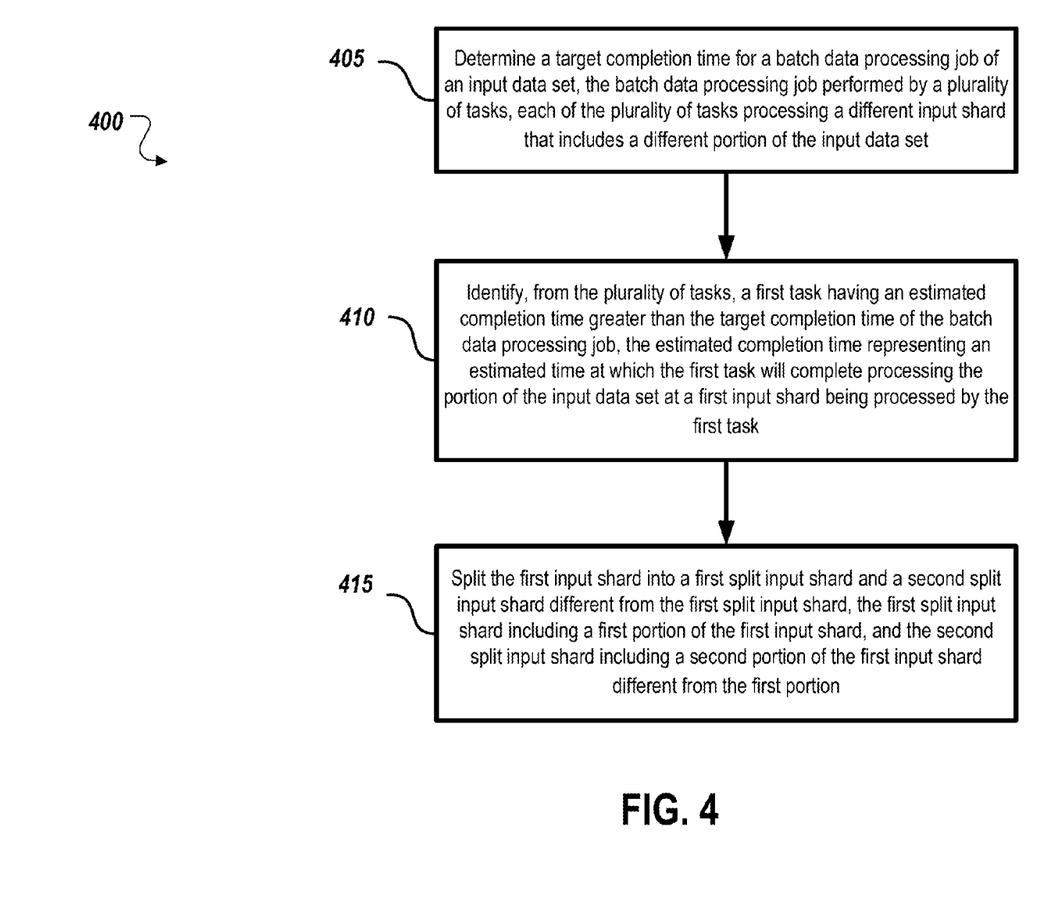
FIG. 4 is a flow diagram of an example process for dynamically adjusting shard allocation during parallel processing operations.

FIG. 4 is a flow diagram of an example process 400 for dynamically adjusting shard allocation during parallel processing operations. At 405, a target completion time for a batch data processing job of an input data set is determined. The batch data processing job may be performed by a plurality of tasks each processing an input shard including a different portion of the input data set.

At 410, a first task from the plurality of tasks is identified having an estimated completion time greater than a target completion time for the batch processing job. In some cases, the target completion time is a deadline specified by an administrator of the batch data processing job for finishing the batch data processing job. The estimated completion time for the first task may represent an estimated time at which the first task will complete processing the portion of the input data set at a first input shard being processed by the first task. In some cases, each of the plurality of tasks includes an estimated completion time representing an estimated time at which the task will complete processing its input shard, and the target completion time is an average of the estimated completion times for the plurality of tasks for the batch data processing job. In some cases, the estimated completion time may be determined taking into account idle tasks associated with the batch data processing job, such as, for example, by assigning an estimated completion time of zero to those tasks. The estimated completion time for each of the plurality of tasks may be determined based at least in part on a size of a portion of the input shard remaining to be processed for each of the plurality of tasks, a processing rate associated with each of the plurality of tasks for a portion of the input shard already processed for each of the plurality of tasks, or a recent processing rate associated with each of the plurality of tasks for a portion of the input shard processed within a time window for each of the plurality of tasks, or on other information.

At 415, the first input shard split into a first split input shard and a second, different split input shard. Each of the split input shards includes a different portion of the first input shard. In some cases, the first split input shard is assigned to be processed by a second task, and the second split input shard is assigned to be processed by a third task different than the second task. In some implementations, the second task is the first task and the third task is an idle task associated with the batch data processing job.

In some cases, identifying the first task and splitting the first input shard are performed by the first task itself. In such a case, the first task may receive the target completion time from a supervisor process associated with the batch data processing job, and compare it to its estimated completion time to determine that it will not complete by the target completion time. The first task may send an indication of a portion of the first input shard that the first task will not be able to process by the target completion time to the supervisor process, and the supervisor process may, in response, assign the portion of the first input shard to an idle task for processing. Identifying the first task and splitting the first input shard may also be performed by the supervisor process.

In some cases, the method 400 includes identifying that the batch data processing job has entered an endgame state where all non-completed shards associated with the input data set are being processed by a task and there are idle tasks available to process shards. In such a case, identifying the first task and splitting the first input shard may be performed after identifying that the batch data processing job has entered the endgame state.

Figure 5:
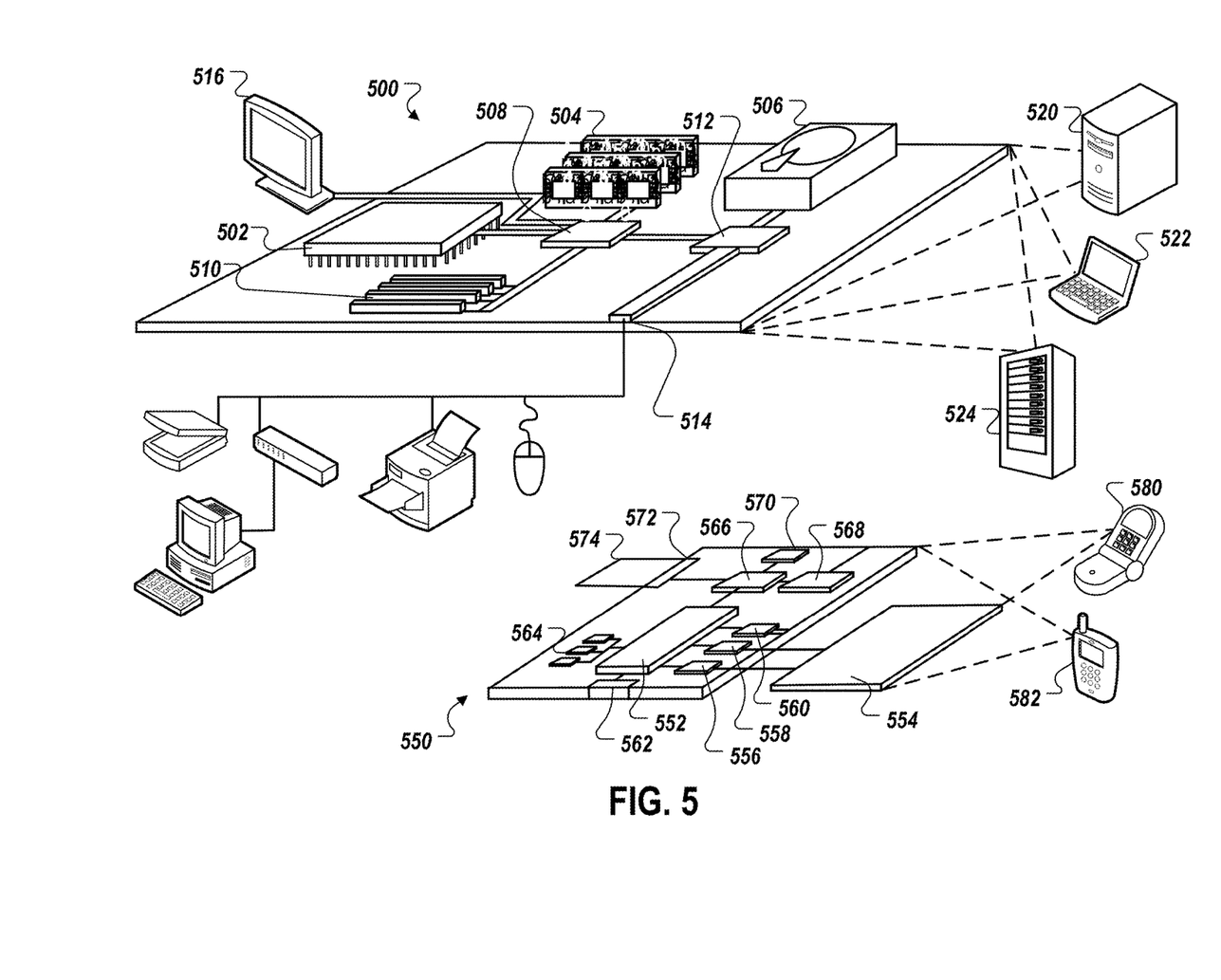
FIG. 5 is a block diagram of an example computing device.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed interface 508 manages bandwidth-intensive operations for the computing device 500, while the low speed interface 512 manages lower bandwidth-intensive operations. Such allocation of functions is exemplary only. In one implementation, the high-speed interface 508 is coupled to memory 504, display 516 (e.g., through a graphics processor or accelerator), and to high-speed expansion ports 510, which may accept various expansion cards (not shown). In the implementation, low-speed interface 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory 564 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a user computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
   determining a target completion time for a batch data processing job of an input data set, the batch data processing job performed by a plurality of tasks, each of the plurality of tasks processing a different input shard that includes a different portion of the input data set;
   identifying, from the plurality of tasks, a first task having an estimated completion time greater than the target completion time of the batch data processing job, the estimated completion time representing an estimated time at which the first task will complete processing the portion of the input data set at a first input shard being processed by the first task, wherein each of the plurality of tasks has a respective estimated completion time representing an estimated time at which the task will complete processing its input shard; and in response to identifying a first task having an estimated completion time greater than the target completion time of the batch data processing job, splitting the first input shard being processed by the first task into a first split input shard and a second split input shard different from the first split input shard, the first split input shard including a first portion of the first input shard, and the second split input shard including a second portion of the first input shard different from the first portion.

2. The method of claim 1, further comprising:
assigning the first split input shard to be processed by a second task; and
inserting the second split input shard into a pool of unassigned shard to await processing by an available task.

3. The method of claim 2, wherein the second task is the first task and a third task is an idle task associated with the batch data processing job.

4. The method of claim 1, further comprising:
identifying that the batch data processing job has entered an endgame state where all shards associated with the input data set are being processed by a task and there is at least one idle task associated with the batch data processing job, wherein identifying the first task and splitting the first input shard are performed after identifying that the batch data processing job has entered the endgame state.

5. The method of claim 1, wherein the target completion time is determined based at least in part on the estimated completion times for the plurality of tasks for the batch data processing job.

6. The method of claim 1, further comprising determining the estimated completion time for each of the plurality of tasks based at least in part on at least one of: a size of a portion of the input shard remaining to be processed for each of the plurality of tasks, a processing rate associated with each of the plurality of tasks for a portion of the input shard already processed for each of the plurality of tasks, or a recent processing rate associated with each of the plurality of tasks for a portion of the input shard processed within a time window for each of the plurality of tasks.

7. The method of claim 1, wherein the target completion time is determined based on at least one of: historical information associated with the batch data processing job, or historical information associated with other batch data processing jobs.

8. The method of claim 1, wherein the target completion time is a deadline specified by an administrator of the batch data processing job for finishing the batch data processing job.

9. The method of claim 1, wherein identifying the first task and splitting the first input shard are performed by the first task itself.

10. The method of claim 9, wherein identifying the first task includes:
receiving, by the first task from a supervisor process associated with the batch data processing job, the target completion time; and
comparing, by the first task, the target completion time to the estimated completion time to determine that the first task will not complete by the target completion time.

11. The method of claim 10, wherein splitting the first task includes:
sending, by the first task, an indication of a portion of the first input shard that the first task will not be able to process by the target completion time to the supervisor process; and assigning, by the supervisor process, the portion of the first input shard to an idle task for processing.

12. The method of claim 1, wherein determining a target completion time for a batch data processing job includes computing an average of the estimated completion times of the plurality of tasks and of estimated completion times for one or more idle tasks associated with the batch data processing job, wherein the estimated completion times for the one or more idle tasks have a value of 0.

13. A non-transitory, computer-readable medium storing instructions operable when executed to cause at least one processor to perform operations comprising:
determining a target completion time for a batch data processing job of an input data set, the batch data processing job performed by a plurality of tasks, each of the plurality of tasks processing a different input shard that includes a different portion of the input data set;
identifying, from the plurality of tasks, a first task having an estimated completion time greater than the target completion time of the batch data processing job, the estimated completion time representing an estimated time at which the first task will complete processing the portion of the input data set at a first input shard being processed by the first task, wherein each of the plurality of tasks has a respective estimated completion time representing an estimated time at which the task will complete processing its input shard; and
in response to identifying a first task having an estimated completion time greater than the target completion time of the batch data processing job, splitting the first input shard being processed by the first task into a first split input shard and a second split input shard different from the first split input shard, the first split input shard including a first portion of the first input shard, and the second split input shard including a second portion of the first input shard different from the first portion.

14. The computer-readable medium of claim 13, further comprising:
assigning the first split input shard to be processed by a second task; and
inserting the second split input shard into a pool of unassigned shard to await processing by an available task.

15. The computer-readable medium of claim 14, wherein the second task is the first task and a third task is an idle task associated with the batch data processing job.

16. The computer-readable medium of claim 13, the operations further comprising:
identifying that the batch data processing job has entered an endgame state where all shards associated with the input data set are being processed by a task and there is at least one idle task associated with the batch data processing job, wherein identifying the first task and splitting the first input shard are performed after identifying that the batch data processing job has entered the endgame state.

17. The computer-readable medium of claim 13, wherein the target completion time is determined based at least in part on the estimated completion times for the plurality of tasks for the batch data processing job.

18. A system comprising:
memory for storing data; and
one or more processors operable to perform operations comprising:
determining a target completion time for a batch data processing job of an input data set, the batch data processing job performed by a plurality of tasks, each of the plurality of tasks processing a different input shard that includes a different portion of the input data set;

identifying, from the plurality of tasks, a first task having an estimated completion time greater than the target completion time of the batch data processing job, the estimated completion time representing an estimated time at which the first task will complete processing the portion of the input data set at a first input shard being processed by the first task, wherein each of the plurality of tasks has a respective estimated completion time representing an estimated time at which the task will complete processing its input shard; and in response to identifying a first task having an estimated completion time greater than the target completion time of the batch data processing job, splitting the first input shard being processed by the first task into a first split input shard and a second split input shard different from the first split input shard, the first split input shard including a first portion of the first input shard, and the second split input shard including a second portion of the first input shard different from the first portion.

* * * * *

UNITED STATES PATENT AND TRADEMARK OFFICE
CERTIFICATE OF CORRECTION

| | | |
|---|---|---|
| PATENT NO. | : 9,983,901 B2 | Page 1 of 1 |
| APPLICATION NO. | : 14/327338 | |
| DATED | : May 29, 2018 | |
| INVENTOR(S) | : Hurwitz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 412 days.

Signed and Sealed this
Eighteenth Day of December, 2018

Andrei Iancu
*Director of the United States Patent and Trademark Office*